US008997692B2

(12) United States Patent
Lipscomb et al.

(10) Patent No.: US 8,997,692 B2
(45) Date of Patent: Apr. 7, 2015

(54) PET FEEDING SYSTEM WITH REMOVABLE FOOD HOLDING CONTAINER

(71) Applicant: Pioneer Pet Products, LLC, Cedarburg, WI (US)

(72) Inventors: John M. Lipscomb, Cedarburg, WI (US); Betsy M. Lipscomb, Cedarburg, WI (US); Qing He, North Andover, MA (US); Stanley L. Suring, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 14/160,162

(22) Filed: Jan. 21, 2014

(65) Prior Publication Data

US 2014/0130747 A1   May 15, 2014

Related U.S. Application Data

(63) Continuation of application No. 13/590,660, filed on Aug. 21, 2012, now Pat. No. 8,631,763, which is a continuation of application No. 12/567,766, filed on Sep. 26, 2009, now Pat. No. 8,397,674.

(60) Provisional application No. 61/100,505, filed on Sep. 26, 2008, provisional application No. 61/525,769, filed on Aug. 21, 2011.

(51) Int. Cl.
*A01K 5/00* (2006.01)
*A01K 5/01* (2006.01)

(52) U.S. Cl.
CPC ............ *A01K 5/0114* (2013.01); *A01K 5/0142* (2013.01)

(58) Field of Classification Search
USPC .............. 119/54, 52.1, 53, 53.5, 61.3, 61.55, 119/710, 52.4
See application file for complete search history.

(56) References Cited

U.S. PATENT DOCUMENTS

| 1,075,855 | A |   | 10/1913 | Riley et al. |
| 1,278,583 | A |   | 9/1918  | Bretz |
| 1,638,270 | A |   | 8/1927  | Nilsson |
| 2,602,420 | A |   | 7/1952  | Peterson |
| 2,854,949 | A |   | 10/1958 | Wiggins |
| 2,944,364 | A |   | 7/1960  | Kelly |
| 3,033,164 | A |   | 5/1962  | Evers |
| 3,074,377 | A | * | 1/1963  | Spencer ......................... 119/54 |
| 3,244,150 | A |   | 4/1966  | Blair |
| 3,648,403 | A | * | 3/1972  | Gommel ....................... 446/491 |

(Continued)

FOREIGN PATENT DOCUMENTS

DE   202006004429   6/2006
EP   0390245        10/1990

(Continued)

*Primary Examiner* — Yvonne Abbott
(74) *Attorney, Agent, or Firm* — Boyle Fredrickson S.C.

(57) ABSTRACT

A pet feeding system that includes a dish assembly configured to regulate intake of food by a pet, such as a cat. The dish assembly includes a housing and a cooperating food-dispensing receptacle that dispenses food into a food-receiving chamber within the housing permitting a pet to access food in the chamber through at least one feeder port that only permits a paw of the pet to reach within the housing to get some food, while preventing direct access to the food by the head or muzzle of the pet. A lip can be provided adjacent the feeder port that provides an obstacle to free withdrawal of the food out of the feeder port.

23 Claims, 11 Drawing Sheets

(56) References Cited

U.S. PATENT DOCUMENTS

| | | | | |
|---|---|---|---|---|
| 3,788,279 | A | 1/1974 | Boehland, Jr. | |
| 3,866,576 | A | 2/1975 | Downing | |
| 4,029,051 | A | 6/1977 | McKinney | |
| D246,627 | S | 12/1977 | Sugiyama | |
| 4,161,924 | A | 7/1979 | Welker | |
| 4,401,056 | A | 8/1983 | Cody et al. | |
| 4,538,548 | A | 9/1985 | Page | |
| 4,574,738 | A | 3/1986 | Tominaga | |
| 4,738,221 | A | 4/1988 | Nock | |
| 4,756,277 | A | 7/1988 | Peng | |
| 4,840,143 | A * | 6/1989 | Simon | 119/52.1 |
| 4,886,016 | A | 12/1989 | Atchley | |
| 4,947,796 | A | 8/1990 | Robinette | |
| 5,009,193 | A * | 4/1991 | Gordon | 119/711 |
| 5,092,274 | A | 3/1992 | Cole et al. | |
| 5,222,461 | A | 6/1993 | Haynes | |
| 5,335,624 | A | 8/1994 | Baxter et al. | |
| 5,394,832 | A | 3/1995 | Briley | |
| 5,467,735 | A | 11/1995 | Chrisco | |
| 5,492,083 | A | 2/1996 | Holladay | |
| 5,649,499 | A | 7/1997 | Krietzman et al. | |
| 5,794,562 | A * | 8/1998 | Hart | 119/52.4 |
| 5,850,797 | A | 12/1998 | Hunicke | |
| D424,757 | S | 5/2000 | Cooper et al. | |
| 6,073,581 | A | 6/2000 | Wang | |
| 6,125,790 | A | 10/2000 | Breedwell | |
| 6,142,099 | A | 11/2000 | Lange, Jr. | |
| 6,167,841 | B1 | 1/2001 | Ho | |
| 6,186,467 | B1 | 2/2001 | Wahls | |
| D454,990 | S | 3/2002 | Lorenzana | |
| 6,378,460 | B1 | 4/2002 | Skurdalsvold et al. | |
| D459,841 | S | 7/2002 | Ross | |
| 6,477,981 | B1 * | 11/2002 | Harper | 119/52.4 |
| 6,481,374 | B1 | 11/2002 | Lillig | |
| 6,520,114 | B1 | 2/2003 | Chun | |
| 6,557,494 | B2 | 5/2003 | Pontes | |
| 6,571,734 | B1 | 6/2003 | Finklea | |
| 6,581,541 | B2 * | 6/2003 | Hollinger | 119/61.54 |
| D498,565 | S | 11/2004 | Cole et al. | |
| 6,845,735 | B1 | 1/2005 | Northrop et al. | |
| 6,848,392 | B1 | 2/2005 | Kreutzer, Jr. | |
| 6,860,229 | B1 | 3/2005 | Craft | |
| 6,915,761 | B1 | 7/2005 | Campbell | |
| 6,945,195 | B1 | 9/2005 | Morrison | |
| 7,077,074 | B2 | 7/2006 | Polimeni, Jr. | |
| 7,198,005 | B2 | 4/2007 | Polimeni, Jr. | |
| 7,207,291 | B1 | 4/2007 | Watts | |
| 7,228,816 | B2 | 6/2007 | Turner et al. | |
| D549,402 | S | 8/2007 | Mangan et al. | |
| 7,320,296 | B2 | 1/2008 | Morrison | |
| 7,600,486 | B2 * | 10/2009 | Ellis | 119/61.5 |
| 7,895,975 | B2 | 3/2011 | Markham | |
| 7,930,994 | B2 | 4/2011 | Stone et al. | |
| 8,186,304 | B2 * | 5/2012 | Harper | 119/74 |
| 8,225,747 | B2 * | 7/2012 | Markham et al. | 119/51.01 |
| 8,336,493 | B1 * | 12/2012 | Weber | 119/52.1 |
| 8,381,684 | B2 * | 2/2013 | Crawford | 119/61.5 |
| 8,448,603 | B2 * | 5/2013 | Northrop et al. | 119/61.54 |
| 8,555,813 | B2 * | 10/2013 | Parks et al. | 119/51.5 |
| 2002/0185073 | A1 | 12/2002 | Fullerton et al. | |
| 2003/0056730 | A1 | 3/2003 | Corti et al. | |
| 2003/0106497 | A1 | 6/2003 | Heinzeroth et al. | |
| 2004/0177815 | A1 | 9/2004 | Sage | |
| 2005/0039689 | A1 | 2/2005 | Mossmer | |
| 2005/0139162 | A1 | 6/2005 | Polimeni | |
| 2005/0217591 | A1 | 10/2005 | Turner et al. | |
| 2005/0268862 | A1 * | 12/2005 | Morrison | 119/707 |
| 2006/0005774 | A1 | 1/2006 | Newman et al. | |
| 2006/0213447 | A1 | 9/2006 | Kitchen et al. | |
| 2006/0231037 | A1 | 10/2006 | Gross | |
| 2006/0231039 | A1 | 10/2006 | Abinanti et al. | |
| 2007/0245968 | A1 | 10/2007 | Iljas | |
| 2008/0072829 | A1 | 3/2008 | Kerrigan et al. | |
| 2008/0141945 | A1 | 6/2008 | Markham | |
| 2009/0064938 | A1 | 3/2009 | Or | |
| 2009/0255475 | A1 | 10/2009 | Black | |
| 2010/0077963 | A1 | 4/2010 | Lipscomb et al. | |

FOREIGN PATENT DOCUMENTS

| | | |
|---|---|---|
| GB | 2218315 | 11/1989 |
| JP | 09051736 | 2/1997 |

* cited by examiner

_US 8,997,692 B2_

PET FEEDING SYSTEM WITH REMOVABLE FOOD HOLDING CONTAINER

CROSS REFERENCE

This application is a continuation of U.S. patent application Ser. No. 13/590,660, filed Aug. 21, 2012, now U.S. Pat. No. 8,631,763, which is a continuation-in-part of U.S. patent application Ser. No. 12/567,766, filed Sep. 26, 2009, now U.S. Pat. No. 8,397,674, which claims priority under 35 U.S.C. §119(e) to U.S. Provisional Patent Application No. 61/100,505, filed Sep. 26, 2008, and this application claims priority under 35 U.S.C. §119(e) to U.S. Provisional Patent Application No. 61/525,769, filed Aug. 21, 2011, each of which is expressly incorporated by reference herein.

FIELD

The present invention relates to a food dish and more particularly to a pet food dish that is capable of regulating or metering food delivered for actual animal consumption.

BACKGROUND

Many animals, including dogs and cats in particular, are instinctively programmed to hunt or otherwise work to obtain their food. However, present day conventional open top food dishes may suppress or blunt these instinctual behaviors or urges of pets. That is because conventional open top food dishes present the food so as to provide unfettered access to the food, whereby the pet does not have to work more than a nominal amount to find or consume the food. Some pets, particularly cats, have a tendency of overeating when presented with unfettered access to a dish full of food. Overeating can lead to obesity and related problems, including thyroid related problems, and other health problems.

SUMMARY OF THE INVENTION

The present invention provides a feeding dish and system that discourages pet overeating and takes advantage of a pet's predatory tendencies to seek and obtain food. The present invention is directed to a feeding dish that is configured to encourage instinctual hunting behavior during feeding by requiring a pet to locate food within a substantially enclosed structure in which the pet is unable to place its muzzle, withdraw pieces of food with, for example, only its paws and then eat the pieces of food after the pieces have been removed. This may make feeding more natural and exciting so as to provide psychological enrichment and may also help limit food intake which may help prevent obesity while promoting proper digestion.

The feeding dish of the present invention holds food within an enclosure that can be a dome or dome shaped that has openings spaced apart and staggered in a manner that encourages more natural hunting instincts of the pet to change its feeding behavior so a given feeding requires more effort on the part of the pet, which may help to prevent overeating and gorging. For example, there simply is no way to limit how much a cat will eat when a conventional food dish is filled with food. As a result of unfettered access to food, many cats eat much more than they need to during a given feeding which in turn can lead to feline obesity, a condition becoming increasingly common in house cats. Such unfettered access to food can cause problems in cats that are not obese as they can still gorge themselves or eat too quickly, which can lead to indigestion. Perhaps just as bad is the fact that feeding time is boring as their natural hunting instincts are virtually never engaged during their innumerable trips to the food dish. The spaced apart and staggered openings may encourage the pet to move around and explore the feeding dish which takes work and intellectual effort and may replicate how a wild predatory animal may instinctively move around freshly killed prey to explore for bit sized portions to eat. In this way, a pet's natural hunting instincts may be engaged during a feeding session using the feeding dish and system according to the invention.

In a preferred embodiment, a feeding dish constructed in accordance with the present invention can include at least a plurality of viewing openings, e.g., viewing windows, in the enclosure, e.g., dome, spaced apart and disposed at a height relative to an interior floor of the dish that permits a pet to see food within the enclosure thereby stimulating the pet to explore the dish much like a predatory animal in the wild does. By permitting a pet to clearly see food within the enclosure at some locations about the enclosure and not be able to as clearly see the food at other locations, natural instincts of a pet to actively search for their food and move around and investigate its meal are advantageously encouraged. In particular, a feeding dish having such viewing windows and/or other openings that may be staggered, provided at different heights, and facing different directions upon a curved or otherwise angled surface(s) through which the viewing windows and/or other openings advantageously encourages a domestic house pet to mimic its ancestral predatory animals. Such configuration encourages the domesticated pet to move around the enclosure of the feeding dish, e.g., circle its food, in an active search or exploration for food during a feeding session much like its ancestral predatory animals.

A feeding dish constructed in accordance with the present invention has at least a plurality of spaced apart food access openings, e.g., feeder ports, in the enclosure that is disposed adjacent to an interior floor of the feeding dish. Each feeder port has a size that limits how much of the body of a pet seeking food can actually enter the enclosure or be inserted into the enclosure. In a preferred embodiment, each feeder port has a size less than that of the head, face, or muzzle of the pet thereby preventing the pet from directly eating food within the enclosure inside the dish. More specifically, each such feeder port is sized large enough to permit a pet to reach its paw through the port opening into the enclosure to grab or otherwise engage food within the enclosure but not large enough to allow its mouth inside the enclosure.

A feeding dish constructed in accordance with the present invention has at least one or a plurality of feeder ports spaced relative to the floor or base of the dish to obstruct unfettered withdrawal from the dish. Such a feeder port construction limits the rate of withdrawal of food grabbed or otherwise engaged by a pet in a manner that makes it more challenging and difficult to get food out of the enclosure. In a preferred embodiment, pluralities of feeder ports are spaced above the floor or base of the dish so as to provide a wall, ledge, or other barrier to a pet pulling food outwardly from within the enclosure toward the feeder port to prevent the cat from simply dragging the food along the floor or base of the dish unobstructed through the feeder port.

Providing a feeding dish having such an upraised or offset feeder port construction advantageously limits the rate at which a pet can remove food from within the enclosure. This in turn limits the rate at which a pet can consume food to correspond to the limited rate at which it can be removed from the enclosure thereby advantageously improving digestion and preventing gorging. By causing a pet to have to work to get its food out of the dish, it also helps stimulate the pet during feeding by activating their hunting instincts. By providing a feeder port construction that obstructs food removal, it forces a pet to "capture" each piece of food it removes by having to not only engage the food piece with its paw but which also requires it to manipulate the captured food piece using its paw in a manner where the food piece grasped by the paw enabling able it to clear the obstruction and pass through the feeder port. Providing such an obstructive feeder port construction limits the amount of food that can pass through the feeder port at once when a paw is withdrawn by allowing only the food piece actually grasped by the paw and manipulated using the paw through the feeder port to exit the enclosure. Such an obstructed food removal path may require pets to feed by way of feeding sessions for that have multiple steps, including finding the food, removing the food, and then finally eating the food.

In a preferred embodiment, each upraised or offset feeder port has a bottom edge spaced above a top surface of the floor or base of the dish enclosed by the dome a sufficient distance so that a pet reaching into the enclosure through a port opening with its paw cannot simply simultaneously drag multiple pieces of food along the floor or base unobstructed through the port opening. The upraised or offset bottom edge of each feeder port defines a lip that provides an obstruction that only allows food engaged by a paw of the pet to be removed when it is gasped by the paw and lifted or pulled over the obstruction provided by the upraised or offset bottom edge. This obstruction prevents other pieces of food engaged by the paw but not actually grasped by the paw from inadvertently being pulled through the feeder port simultaneously with the paw. As a result, only a single piece of food is typically withdrawn through a feeder port at a time.

In a preferred embodiment, the feeder port lip extends upwardly by at least one-half of the width or diameter of an average piece of food disposed within the enclosure to provide a desired amount of obstruction or opposition to removal that limits the amount of food removed through the port with the paw of a pet. For example, where kibble-type pet food is used, the lip extends upwardly from the floor or base to a height that is at least one-half of the width or diameter of an average piece of kibble to provide an obstruction over which a pet engaging the kibble with its paw must manipulate the kibble to clear it and remove it from the enclosure of the pet feeding dish.

In another preferred embodiment, the feeder port lip is sized so it extends upwardly by the width or diameter of an average piece of food disposed within the enclosure. For example, where kibble-type pet food is used, the lip extends upwardly from the floor or base to a height that is about the width or diameter of an average piece of kibble to provide an obstruction over which a pet engaging the kibble with its paw must lift or otherwise grasp and manipulate the kibble to remove it from the feeding dish. This not only causes a pet to have to exert significant effort to get food into its mouth, much like as in the wild, it also helps limit what goes into its mouth to being bite sized which limits its rate of food intake. In slowing down eating, digestion is advantageously aided.

In another preferred feeding dish embodiment, a food-holding trough can be disposed outwardly of at least one of the feeder ports. Such a food-holding trough not only can help further challenge a cat during a feeding session in a manner that helps invoke its natural hunting instincts, such a trough also helps prevent food removed from the enclosure by a cat from being wasted and to reduce cleanup required around the feeding dish. In a preferred embodiment, the food-holding trough is a channel that extends exteriorly about the outer periphery of the feeding dish alongside and underneath each feeder port so that a piece of food removed by a cat from the enclosure is collected by the trough, if not immediately consumed by the cat. Where the feeding dish is circular or round, the trough can be an uninterrupted generally annular channel having a flange or lip extending upwardly about its outer edge.

In one preferred feeding dish embodiment, the enclosure is a dome that can be generally hemispherical in shape having pluralities of feeder ports formed in the dome sidewall that extend completely through the dome permitting interior access by a pet reaching its paw within to obtain a piece of food housed between the dome and a base of the dish that provides an interior dish floor upon which pieces of food are disposed. Each feeder port is located relative to the dish floor so as to obstruct uninterrupted removal of food from the feeding dish when a piece of food is grasped by a paw of a pet reaching through a feeder port into the dish and pulled back toward the feeder port. Each feeder port has a bottom edge upraised from the dish floor or relative to an interior channel extending alongside the feeder port that defines an upraised lip that obstructs food grasped by a pet from being uninterruptedly removed. Such an upraised lip also advantageously prevents multiple pieces of food or multiple kibbles from being pulled through a feeder port at once by a pet thereby helping meter removal of food from the dish. Preferably, such a feeder port construction meters food removal so that a single piece or kibble of pet food is removed each time a pet reaches its paw through a feeder port, engages multiple pieces or kibbles of pet food within the dish, and attempts to pull them through and out the feeder port.

Such a feeding dish can also have a plurality of viewing windows formed in the dome through which a pet can directly see food lying on the floor of the base of the feeding dish thereby presenting the food within the dish in a manner that may stimulate hunting instincts in the pet. In a preferred embodiment, the dome can be made of substantially transparent or translucent material that also allows a pet to see food disposed inside the dish. Such a combination of viewing windows and translucent or substantially transparent dome window sidewall construction can help entice a pet into interacting with the feeder ports of the dish in a manner that encourages more natural hunting and feeding behavior.

In a preferred feeding dish embodiment, there are feeder ports spaced about the periphery of the dish. Such a feeding dish embodiment can include a plurality of spaced apart viewing windows adjacent the feeder ports. In one preferred feeding dish embodiment, viewing windows in feeder ports are staggered such that a viewing window is disposed between each pair of adjacent feeder ports with each viewing window extending to a height greater than that of the feeder ports. If desired, particularly where viewing windows are not employed, the dome can be made of a generally transparent or translucent material that enables a cat walking by the feeding dish to see food within the feeding dish enclosed by the dome.

In one embodiment of the invention, a pet feeding system is provided that includes a floor and a housing that extends upwardly from the floor so that a chamber in which food can be held is defined between the floor and the housing. The housing may include a sidewall that extends away from the floor and a feeder port that extends through the sidewall and opens into the chamber. The sidewall may extend generally angularly with respect to the floor. Openings may extend through the sidewall and may be sized larger than a paw of a pet using the pet feeding system so as to allow insertion of the paw of the pet into the chamber for accommodating removal of the pet food from the chamber by way of the paw of the pet and sized smaller than a head of the pet so as to prevent insertion of the head of the pet into the chamber of the housing. The housing may also include a lip that extends between the floor and the feeder port so that food being removed from the chamber through the feeder port must travel up and over the lip of the housing. This may provide an obstacle for a pet to overcome in order to remove food from the pet feeding system that may provide psychological enrichment and may slow the rate at which the pet consumes its food.

In another embodiment, the lip may be defined by a portion of the sidewall that extends under the feeder port. The lip may include an edge that defines at least a portion of a perimeter of the feeder port. A lip height defined by a distance between the floor and the lip edge may be shorter than a feeder port height. The lip height may be between about 10 percent and 20 percent of the feeder port height This may provide the feeder port with a large enough opening and a lip that is short enough so that removal of the food from the chamber is not unduly frustrating for the pet but instead provides psychological enrichment and a food consumption rate reduction for the pet that allows enough food to be consumed for maintaining health while discouraging overeating.

In another embodiment, the housing defines a longitudinal axis that extends generally orthogonally with respect to the floor, for example, in an upright direction, and the lip is spaced further from the longitudinal axis of the housing than at least a portion of the feeder port. The lip may include an upper edge that extends generally parallel to the floor so that the lip defines a generally constant height dimension along a length of the lip. This may facilitate removal of food from the chamber by way of overhand-type pawing motions that may correspond to instinctive movements and allow for removal of the food from the chamber without being unduly frustrating for the pets, and while instead providing psychological enrichment and food consumption rate reductions which may discourage overeating.

In another embodiment, a trough may extend outwardly beyond the housing. The trough may extend at least partway along a perimeter of the housing, optionally, continuously around the entire perimeter of the housing. The trough may be open from above and may include a lower wall and a collar that extends upwardly from the lower wall. The trough may define a trough width that is larger than a collar height so that the trough may be wider than it is tall. This may provide another obstacle for the pet to overcome while trying to remove food from the pet feeding system. This may reduce how much food can be removed from the pet feeding system at a given time, which may encourage a pet to alternatingly remove and eat relatively small amounts of food, which may reduce how much mess a pet may create around the pet feeding system by encouraging the pet to eat all of the removed food before removing more food.

In another embodiment, the lower wall of the trough and the floor are provided at different heights with respect to the pet feeding system, providing a stepped relationship between the floor and the trough. The lower wall of the trough may be provided at a lower height than the floor. This may ensure that when a pet pulls a piece of food up and over the lip, that piece of food will fall into the trough below and outside of the lip, which may allow for removal of the food from the chamber in a manner that is not unduly frustrating for the pet, but which may reduce food consumption rate and discourage overeating.

In another embodiment, the lip defines a lip height that is greater than a collar height of the trough collar. The lip height may be between about 1.5 and 2.5 times greater than the collar height, for example, about 1.8 times the collar height. This may provide the lip as a primary obstacle to food removal that is relatively more difficult to overcome than the collar as a secondary obstacle to food removal that is relatively easier to overcome once the food is in plain view and accessible from above the trough. This may ensure that removal of food from the pet feeding system is not unduly frustrating for the pet, while providing multiple obstacles to overcome that reduce food consumption rate and discourage overeating.

BRIEF DESCRIPTION OF THE DRAWINGS

One or more preferred exemplary embodiments of the invention are illustrated in the accompanying drawings in which like reference numerals represent like parts throughout and in which.

Figure 1:
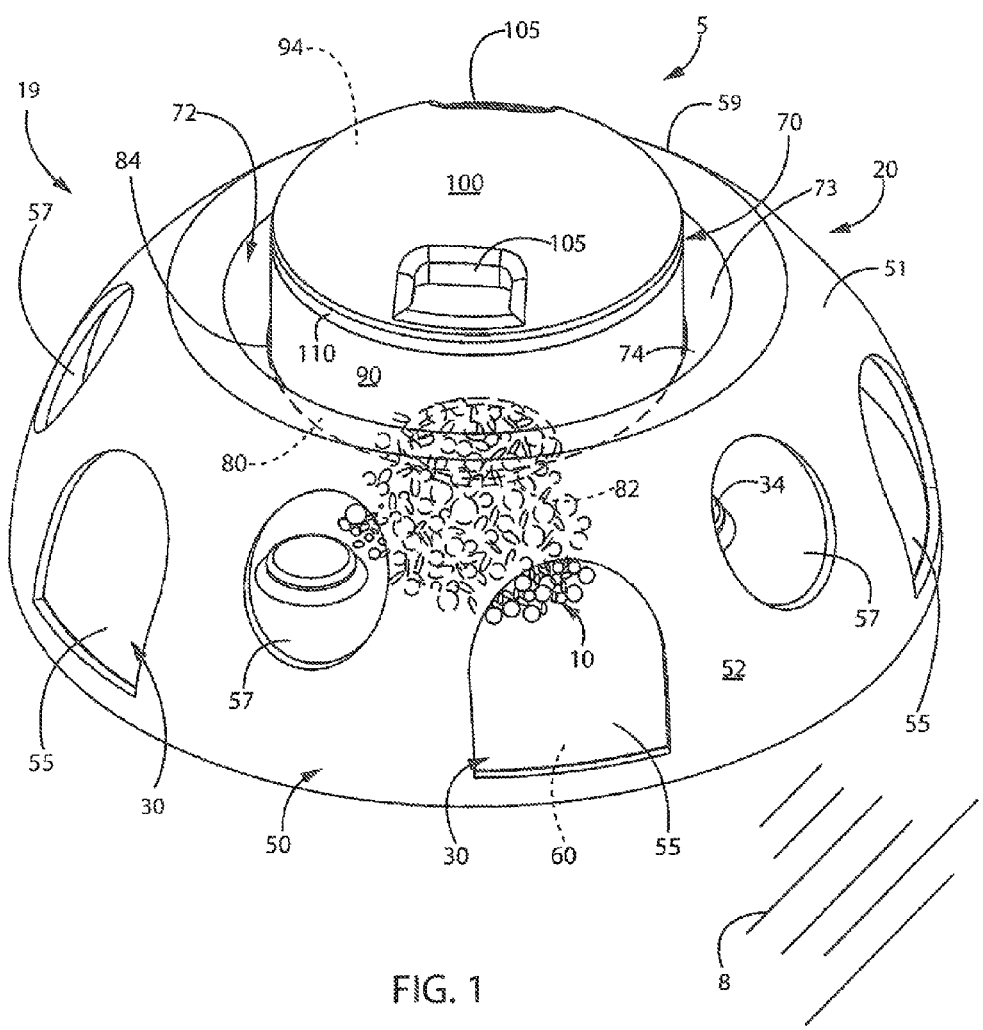
FIG. 1 is an upper pictorial view of a first embodiment of a dish assembly of a pet feeding system of the invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 2:
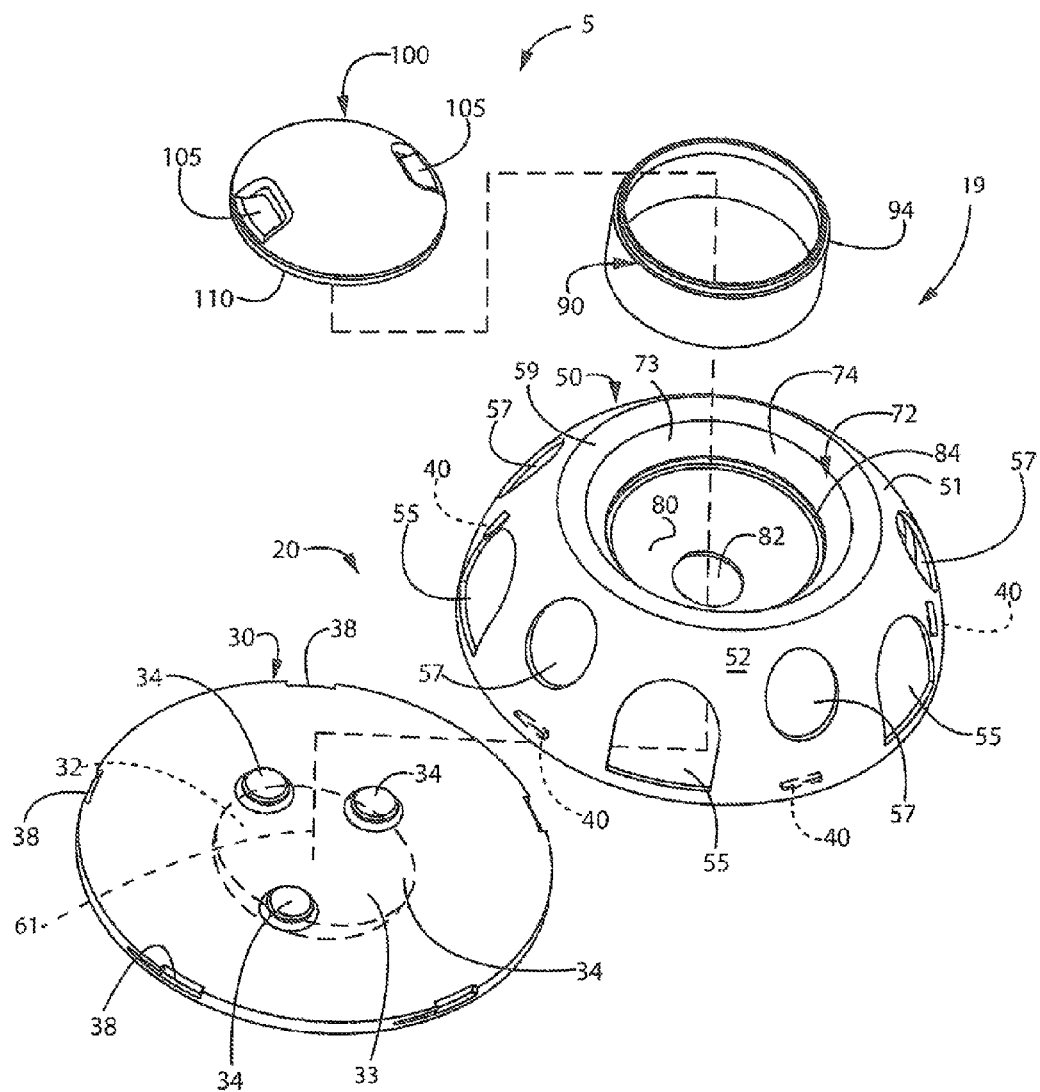
FIG. 2 is an exploded pictorial view of the dish assembly of FIG. 1.
Figure 3:
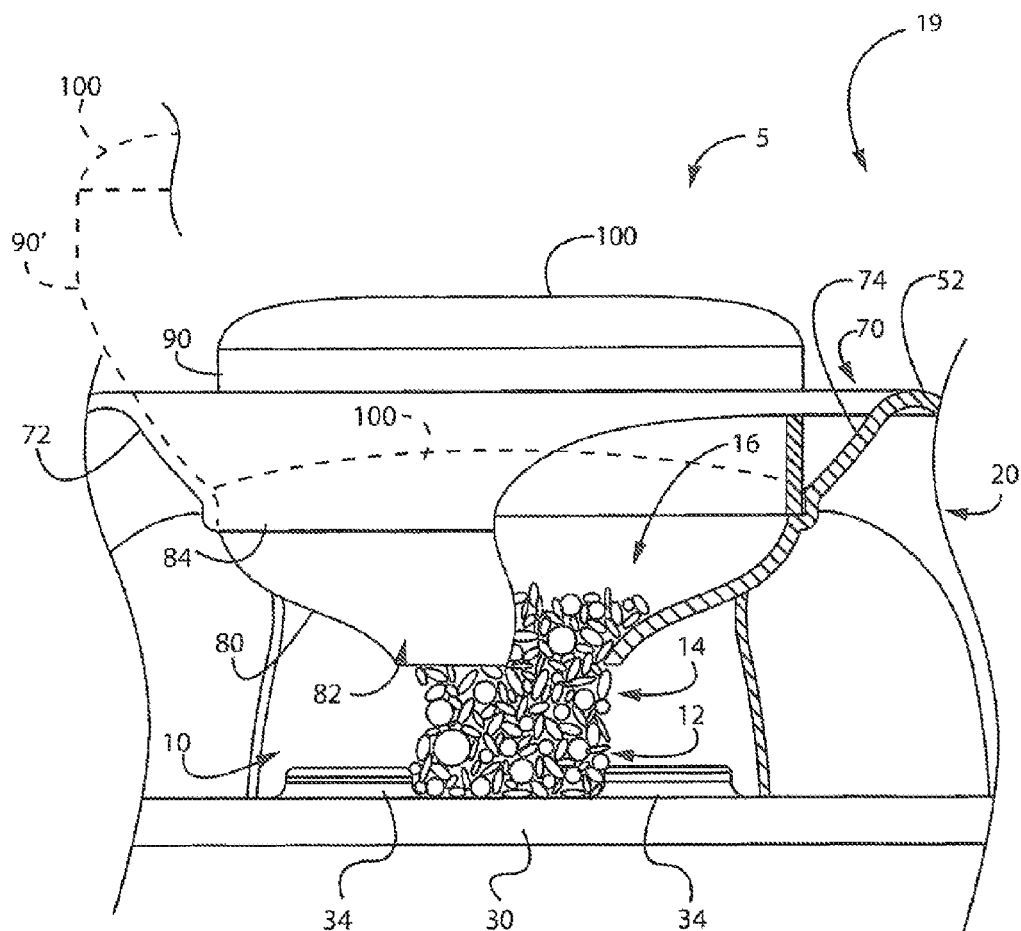
FIG. 3 is a cross-sectional side elevation view of various components of the dish assembly of FIG. 1.

FIGS. 1-3 illustrate an exemplary but preferred embodiment of a pet feeding system 5 that is designed for providing pet food 10 to a pet, such as a cat or dog not illustrated), in a manner that regulates and thereby is capable of reducing the pet's food consumption rate. The pet feeding system 5 includes a pet feeder 19 formed of a feeding dish or dish assembly 20 that holds and meters food delivery. The dish assembly 20 shown in FIGS. 1-3 includes (i) a floor 30, (ii) a housing 50 that extends upwardly from the floor 30, (iii) a food-receiving chamber 60 which is a void space defined between the floor 30 and housing 50, and can include (iv) a bowl assembly 70 that is shown arranged toward an upper portion of the housing 50 and can serve as a food-dispensing receptacle.

Still referring to FIGS. 1-2, floor 30 is removably attached to a bottom portion of the pet feeder housing 50 thereby enabling it to be easily removed for cleaning, such as in a dishwasher. If desired, floor 30 can instead be integrally formed as part of the housing. Floor 30 supports food 10 that has been delivered within the housing 50 in the food-receiving chamber 60, and can also support the housing 50 itself.

If desired, floor 30 can be configured in a manner that helps contain food 10 received in the chamber 60 in a desired area and/or that provide obstacles to make it more challenging for a pet to reach and obtain food 10 in the chamber 60. For example, as is shown in FIGS. 1 and 2, floor 30 includes a food supporting platform 32 from which preferably at least one and in this embodiment being shown as including a plurality of, upraised portions 34 extend upwardly therefrom. The upraised portions 34 are shown as having button-like configurations with generally flat upper surfaces and circumferential sidewalls that define circular perimeters, however, it is understood that the upraised portions 34 may have other perimeter shapes and curved or irregular upper or other surfaces. In a preferred embodiment, there is a plurality of pairs, i.e., at least three upraised portions 34 spaced about an area of the platform 32 where food 10 dispensed through an opening 82 is received, e.g., lands upon, which opposes or prevents food dispensed into the chamber 60 from freely flowing toward any one of the further outwardly disposed feeder ports 55 thereby helping to meter food intake by the pet. In a currently preferred embodiment, there are at least three upraised portions 34 which are generally circular in shape that are equidistantly and/or equiangularly spaced about and outwardly of a center of the platform 32 where food 10 lands after it drops through the opening 82 of the housing 50 downwardly onto the generally centrally located food landing portion 33 of the platform 32.

If desired, platform 32 can also be upraised. Additionally, the platform 32 and food-flow opposing upraised portions 34 can be integrally formed of or as part of the floor 30 in a manner that produces a floor 30, platform 32, and upraised portions 34 as a single component that is of one-piece, unitary, and substantially homogenous construction. If desired, they can be constructed separately, such as in disc or pad form and attached to the floor 30.

Referring specifically now to FIG. 2, which discloses an embodiment in which the floor 30 is removably attached to the pet feeder housing 50 where the floor 30 and housing 50 have cooperating interlocking structures configured to engage each other as a snap fit, twist locking, or other suitable engagement mechanism(s). Twist locking versions include cooperating grooves or ramps 38 and tabs 40 that engage each other to couple the floor 30 with the housing 50. Ramps 38 are provided on an outer circumferential surface at the perimeter edge of the floor 30. The tabs 40 extend inwardly from the housing 50 and are spaced from each other by the same distances as those between the ramps 38, whereby the floor 30 and housing 50 mechanically engage each other at multiple locations about the perimeter of the dish assembly 20. This is done by aligning the corresponding ramps 38 and tabs 40 with each other and then rotating the housing 50 upon the floor 30 so that it circumferentially advances until the ramps 38 and tabs 40 are fully engaged with each other.

Referring again to FIGS. 1-2, housing 50 includes a sidewall 52 that extends around a periphery of the chamber 60 and multiple openings, such as, feeder ports 55 and windows 57, which extend through the sidewall 52 and permit access to the chamber 60. A bottom portion of the sidewall 52 fits over and just outside of the outer perimeter of floor 30, whereby the floor 30 is housed concentrically within such overlapping bottom portion of the sidewall 52. In this way, the floor 30 is recessed into and arranged concentrically within the housing 50 so that an upper surface 51 of the housing 50 is elevated with respect to a bottom edge of the housing 50 at the overlapping portion. It is at this overlapping portion of the floor 30 and sidewall 52 where (i) the tabs 40 that extend from an inwardly facing surface of the sidewall 52, and (ii) the ramps 38 of the outwardly facing surface of floor 30 engage with each other. For embodiments in which the floor 30 has a round perimeter shape, the sidewall 52 extends upwardly from the floor 30 in a generally annular fashion, and a diameter of the sidewall 52 decreases as a height of the sidewall 52 increases. This gives the sidewall 52 a generally hemispherical or dome shape that covers the chamber 60.

As is shown in the drawing figures, the pet feeder housing sidewall 52 is generally toroidal having a generally arcuate sidewall cross section that can be generally hemispherical in cross section with the sidewall 52 having an outer sidewall surface 51 that encompasses or bounds an inner sidewall surface 73 that defines a recessed bowl sidewall 74 that forms the bowl 72 which can hold pet food 10. Such a toroid-shaped sidewall 52 can have an apex or crown 59 at its highest point where the outer sidewall surface 51 and inner sidewall surface 73 converge that is curved or arcuate in cross section and that is generally circular when viewed from above. As is discussed in more detail below, the generally convex outer sidewall surface 51 of the generally donut-shaped housing sidewall 52 defines a pet feeding side of the housing 50 having a plurality of spaced apart feeder ports 55 through which an animal can access food 10 within the pet feeder 19 and the generally concave inner sidewall surface 73 defines a recessed food holding or food metering side of the housing 50 which holds and delivers food 10 to the pet accessible food-receiving chamber 60.

Regardless, at least a portion of the sidewall 52 extends generally angularly with respect to the floor 30. As generally represented by the dashed exploded-parts lines of FIG. 2, the floor of this embodiment defines a central axis 61 that extends through the housing 50 and generally orthogonally with respect to the floor 30. The sidewall 52 of the housing 50 extends away from the floor 30 so that the sidewall 52 defines different widths at different locations along the length of the central axis 61 and thus at different heights of the housing 50. The multiple openings of the feeder ports 55 and windows 57 are provided at different distances from the central axis 61 and at different heights along the housing, whereby the feeder ports 55 define lower openings in a lower portion of the housing 55 and the windows 57 define upper openings in an upper portion of the housing 50. The windows 57 are arranged relatively closer to the central axis 61 than the feeder ports 55. Since the sidewall 52 extends angularly away from the floor 30, the openings of the feeder ports 55 and windows 57 face different directions or angles with respect to the central axis of the housing 50. Portions of each of the feeder ports 55 and windows 57 also face different directions or angles with respect to the central axis of the housing 50 than other portions of each of the feeder ports 55 and windows 57. As shown, upper portions of openings of each of the feeder ports 55 and windows 57 face generally more upwardly and are closer to the axis of the housing 50 than lower portions of the openings of the feeder ports 55 and windows 57. This may allow a pet to peer through multiple openings of the housing 50 at different viewing heights and by way of different viewing angles so as to encourage actively investigating food within the pet feeding system 5.

Still referring to FIGS. 1-2, at least one and, preferably, multiple circumferentially spaced apart feeder ports 55 are arranged about and extend through the sidewall 52. The feeder ports 55 are configured to allow a pet, for example, a cat 21 (depicted in phantom in FIGS. 7-10), to access food 10 by extending its paw 23 through the sidewall 52 in a first direction and dragging sonic of the food 10 out of the dish assembly 20 in a second, opposite direction. Each feeder port 55 is a passageway defined between two parallel and upwardly extending side edges that are connected to each other by an arcuate top edge. In some embodiments, an overall height of the feeder port 55 is about 1.5 inches or about 2 inches, and extends about two-thirds of the way up the height of or along the outer surface of the sidewall 52. In some embodiments, an overall width of the feeder port 55 is about 1.25 inches or about 1.75 inches and the port width being about one-quarter of the outer diameter of the sidewall 52. These exemplary dimensions are most suitable for implementations of dish assembly 20 that are configured for use with cats as the pets, in light of typical sizes of domesticated cats. At least one and, preferably, multiple circumferentially spaced apart windows 57 extend through the sidewall 52 at locations that are higher up on the sidewall as compared to the feeder ports 55. The windows 57 are round, oval, or otherwise shaped apertures that are configured to allow a pet to see into the chamber 60, that is, through the sidewall 52 to see the food 10 sitting upon the floor 30. Each window 57 is somewhat shorter and narrower than the feeder port 55, dissuading pets from reaching through the windows 57 instead of the feeder ports 55.

Regardless of the particular shape and dimensions of the feeder ports 55 and windows 57, together, they give the sidewall 52 a generally perforated configuration in which the material of the sidewall 52 continuously meanders between the feeder ports 55 and windows 57 which are shown as being staggered with respect to each other so that the feeder ports 55 and windows 57 face different directions outwardly of the housing 50. The feeder ports 55 and windows 57 can be sized so that the overall surface area of the sidewall 52 is at least about 25 percent void space, optionally, at least about 50 percent void space, at least about 75 percent void space, so long as there is enough material in sidewall 52 to suitably support the bowl assembly 70. Preferably, the openings of the feeder ports 55 and/or windows 57 are sized larger than the paws of the pet(s) and smaller than the head(s) or muzzle(s) of the pet(s). In this way, the openings of the feeder ports 55 and/or windows 57 are configured so as to allow insertion of the paw of the pet into the chamber 60 for accommodating removal of the pet food from the chamber 60 by way of the paw(s) of the pet. At the same time, the openings of the feeder ports 55 and/or windows 57 are configured for preventing insertion of the head of the pet into the chamber 60 by having smaller sizes than the head or muzzle of the pet. In this way, the pet must feed by way of feeding sessions that have multiple steps, including finding the food, removing the food, and then finally eating the food.

Referring now to FIGS. 1-3, bowl assembly 70 includes a bowl 72 that can also serve as a food-dispensing receptacle, a chute 80, a container 90, and a cap 100 that, together, define an enclosure which holds food 10 prior to its dispensation upon the floor 30. An upper edge of bowl 72 is connected to the upper edge of the sidewall 52 of housing 50. From the ring-like connection between the bowl 72 and housing 50, a sidewall 74 of the bowl 72 extends downwardly into the chamber 60, whereby the bowl 72 of this embodiment is integral with and defines a concavity or depression that is recessed into the housing 50.

A chute 80, which is configured to direct and guide food 10 that drops from the bowl 72 into the chamber 60, extends downwardly from the bottom of bowl 72 further into the chamber 60. Chute 80 preferably has a funnel-like contour and its upper edge is connected to the lower edge of bowl 72 so that the bowl sidewall 74 and chute 80 define a unitary, continuous structure. At the bottom of chute 80, an opening 82 extends therethrough which faces downwardly toward the floor 30 Opening 82 is sized and configured based on the particular type of food 10 that is used in the dish assembly 20.

For example, when food 10 is a dry, kibble type cat food made of multiple particles or granules 11 of food 10, the opening 82 can have a diameter of about 1.5 inches or a bit less, for example, about 1⅜ inch, and is spaced about 1 inch, or a bit less, for example, about ⅞ inch, from the upper surface of floor 30, whereby the opening 82 in such embodiments is spaced from the floor 30 by a distance that is less than a width or diameter dimension of the opening 82. In a preferred embodiment, the opening 82 is sized, e.g., has a diameter, so as to allow a plurality of pairs, i.e., at least three, food particles or kibbles 11 to pass through substantially simultaneously. The opening diameter, spacing from the bottom wall, and tapering angle of the chute 80 are selected to provide a desired amount of food 10 on the floor 30 while maintaining a remainder of the food in the bowl 72 and chute 80 in a manner that is described in greater detail elsewhere herein. Where the food 10 is dog food having larger particles or chunks, such dimensions can be increased in accordance with that discussed herein to produce a dish or dish assembly adapted for dog food use.

Referring now to FIGS. 2-3, at an upper end of the chute 80, an annular land 84 extends radially inwardly from the chute 80, optionally from the bowl sidewall 74, providing a ledge or shoulder-like structure. A diameter of the annular land 84 preferably corresponds to a diameter of both the container 90 and cap 100 so that the annular land 84 can support the cap 100 directly, such as where no container 90 is used, or can support the container 90 which in turn receives the cap 100. When the annular land 84 supports the cap 100 directly, the enclosure that holds the food 10 is defined between the chute 80 and the cap 100 and has a relatively smaller storage capacity. This is shown in FM. 3 as the lower-most cap 100 represented in dashed phantom outline. A relatively larger capacity container 90' and corresponding larger cap 100 are shown toward the left-hand side of FIG. 3, in dashed phantom outline and which expands in width along its height so that a lower portion of the larger container 90' generally follows the contour of the bowl 72.

Figure 11:
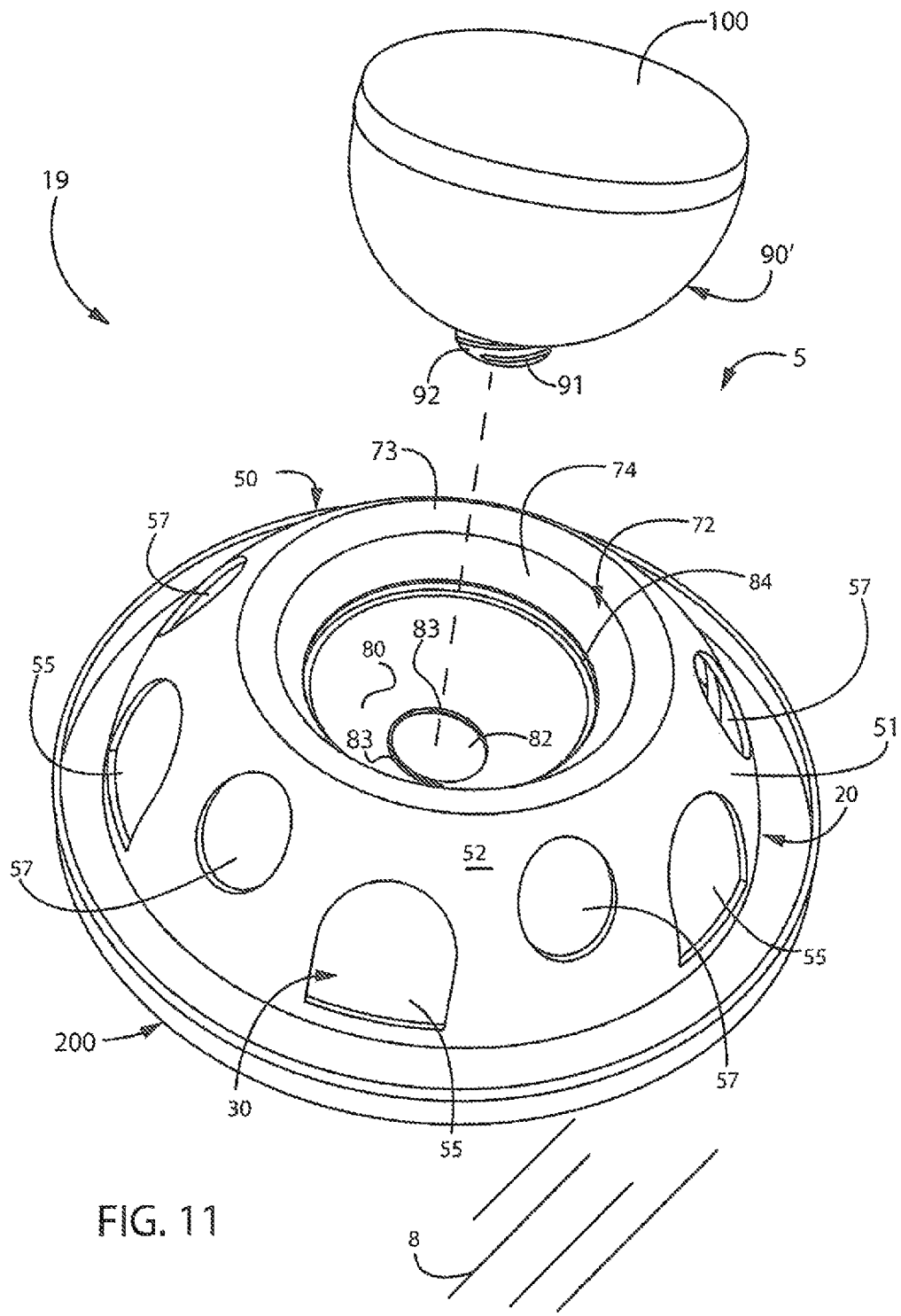
FIG. 11 is a partially exploded pictorial view of a variant of the dish assembly of FIG. 2.

FIG. 11 shows a preferred embodiment of the relatively larger capacity container 90' in more detail with the container 90' configured to releasably lock into the chute 80. In this embodiment, threads 83 are formed in a lower portion of the chute 80, adjacent the opening 82. Threads 91 are arranged on a lower portion of the container 90, shown as extending from a neck 92 that extends downwardly from a sidewall of the container 90. The threads 91 of the container 90 threadedly engage the threads 83 of the chute 80 to engage and releasably lock the container 90 and housing 50 of the dish assembly 20 to each other. When the container 90 and dish assembly 20 are engaged each other, the neck 92 of the container may be concentrically seated within the opening 82 of the chute 80 and at least a lower portion of the sidewall of the container 90 may nest against a sidewall of the chute 80.

Referring again to FIGS. 1-3, container 90 is a cylindrical tube formed of an endless sidewall that sits upon the annular land 84 and extends upwardly from the chute 80 and/or bowl 72, over the opening 82 of the chute 80. If desired, a friction fit can be provided between a portion of the generally cylindrical sidewall forming the container 90 adjacent the axial end thereof that seats on the land 84 and an adjacent portion of the sidewall 74 extending alongside the land 84 helping to keep the container 90 removably seated on the land 84. In another preferred embodiment, the axial end of the container 90 that ordinarily seats on the land 84 can be configured with threads, like threads 91, which threadably engage threads, like threads 83, formed in an adjacent portion of the sidewall 74 extending alongside land 84 enabling the container 90 to be removably screwed onto the sidewall 74. The volume of container 90 is selected so that the dish assembly 20 can hold a desired amount of food, whereby shorter containers 90 are used when less food is to be held in the dish assembly 20 and longer (taller) containers 90 are used when more food is to be held in the dish assembly 20. An upper edge of the container 90 includes an annular land 94 that is largely analogous to the annular land 84 of the chute 80, whereby it is configured as a supporting shoulder for holding the cap 100 on the top of the container 90.

Referring now again to FIGS. 1-2, cap 100, as discussed before, can be placed directly on the annular land 84 of the chute 80 if the container 90 is riot being used, or can be placed on the annular land 94 of the container 90 if the container is being used. Cap 100 has multiple handgrips 105 formed in its outer surface and a downturned lip 110 about its outer periphery that seats upon the annular land 84, 94 of the chute 80 or container 90. The cap 100 prevents a cat from eating directly from the bowl 72 thereby enabling the top height of the bowl 72 to be made low enough where a cat can access it (thus necessitating use of cap 100).

Preferably, the various components of the dish assembly 20 are made from any of a variety of suitable polymeric materials that are well known within the art. Furthermore, such polymeric components such as for example, various ones of the floor 30, housing 50, and bowl assembly 70, can be impregnated, coated with, and/or otherwise treated with various antibacterial and/or moisture absorbent materials. In some embodiments, various components of the dish assembly 20 can also be scented, such as to attract a cat or other pet to the chamber 60. In yet other embodiments, one or more components of the dish assembly 20 are made from non-polymeric materials, for example, being made from ones of ceramic, glass, metallic, and/or other materials, depending on the intended end use configuration of the dish assembly 20.

in at least one preferred embodiment, at least the dish housing 50 is made of plastic, such as a polyethylene or polyurethane, which is clear enough where a pet can view food 10 disposed in the chamber between the housing 50 and floor 30. This not only helps a pet to locate the food 10, but also adds to the challenge presented to the pet by enticing the pet, yet making it difficult to reach. In one preferred embodiment, the dish housing 50, including the bowl 72, chute 80, opening 82, ports 55 and windows 57, are formed as a single component that is of one-piece, unitary, and substantially homogenous construction.

Figure 4:
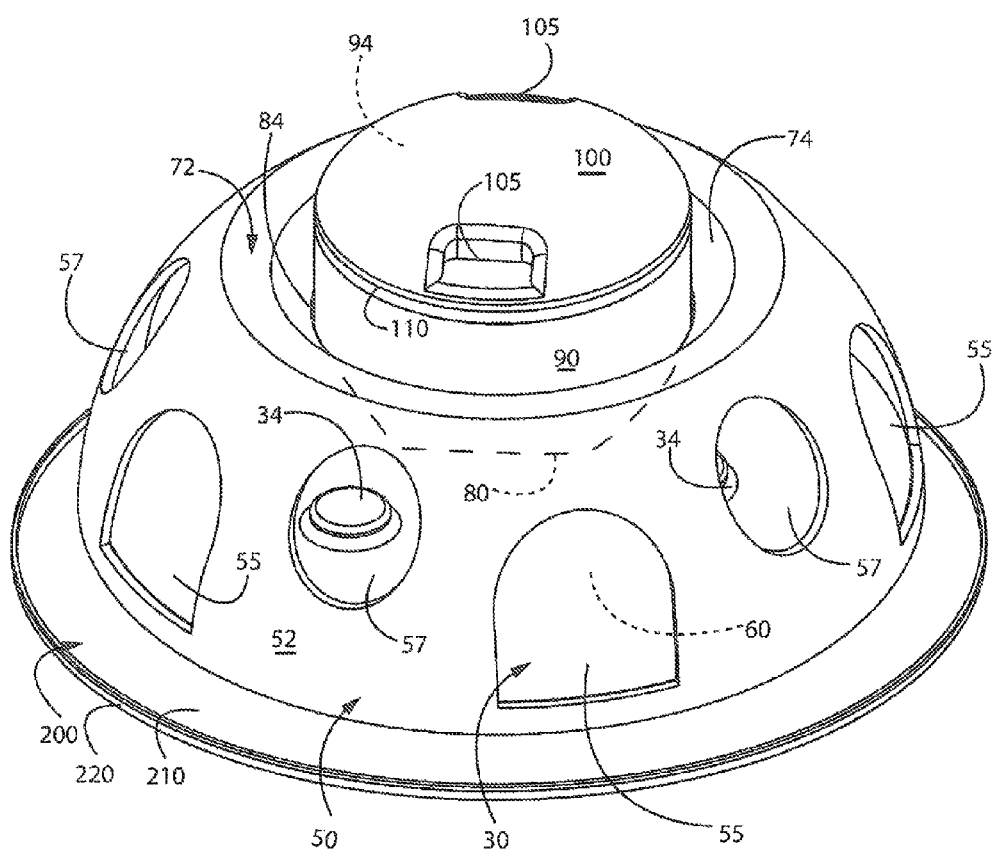
FIG. 4 is an upper pictorial view of a variant of the pet feeding system of FIG. 1.
Figure 5:
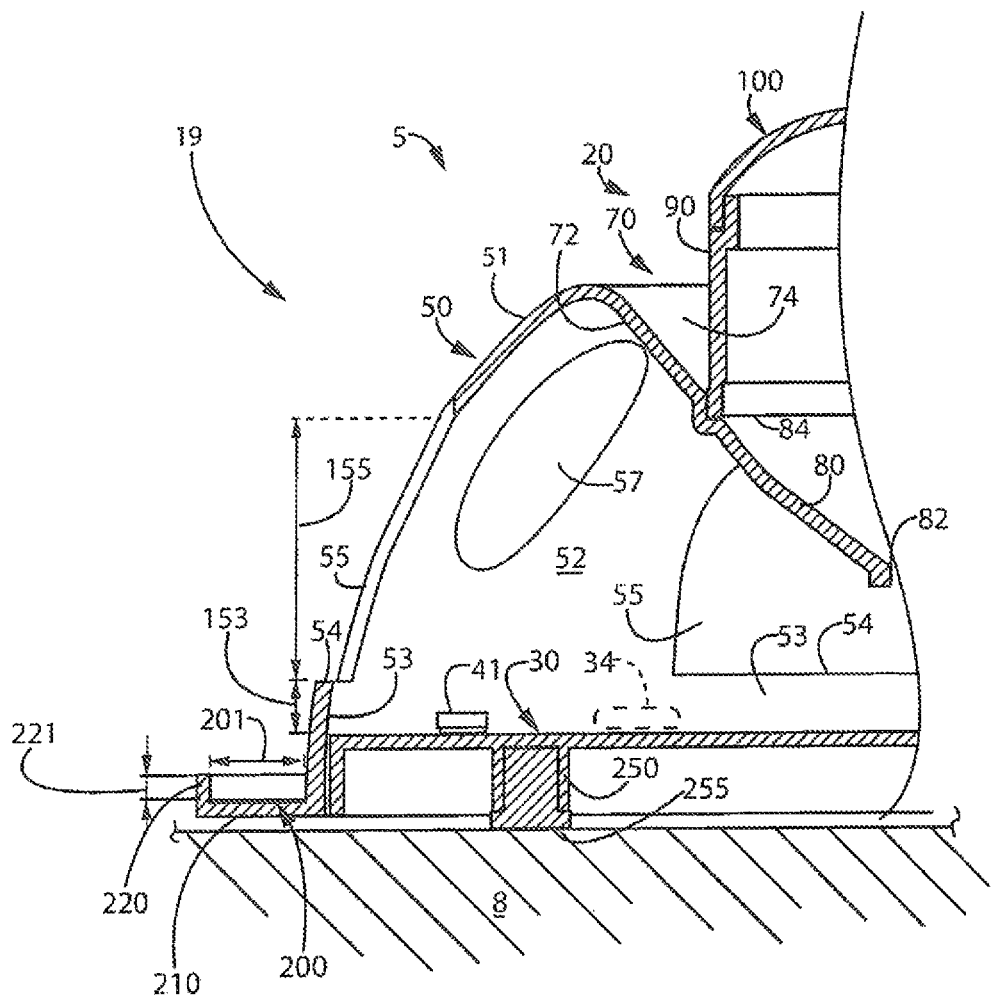
FIG. 5 is a cross-sectional view of the dish assembly of FIG. 4, taken at line 5-5 of FIG. 4.

Referring now to FIGS. 4 and 5, this embodiment is exemplary of a dish assembly 20 of the pet feeding system 5 that is made from, or has at least some components made from, plastic materials. In this embodiment, the housing 50 includes a lip 53 that defines an obstacle for a pet to overcome in order to remove food 10 from the pet feeding system 5. The lip 53 extends between the floor 30 and the feeder port 55. In this particular embodiment, the lip 53 is integral with and defined by a portion of the sidewall 52 that extends below the feeder port 55. Lip 53 has a generally rectangular perimeter shape, oriented sideways, and tilts and curves inwardly in a manner that corresponds to the profile shape(s) of the sidewall 52. Lip 53 includes an upper edge 54 that defines a lower portion of a perimeter of the feeder port 55, whereby lip upper edge 54 extends under the feeder port 55.

Referring now to FIG. 5, a lip height 153 is defined by a distance between the floor 30 and the lip upper edge 54. In this embodiment, the lip upper edge 54 extends generally parallel to the floor 30 so that the lip height 153 is generally constant along the length of the lip upper edge 54. In one preferred embodiment, the lip height 153 is shorter than a feeder port height 155 which is defined by a height of the opening of the feeder port 55. The lip height 153 is preferably between about 10 percent and 20 percent of the feeder port height, for example, about 18 percent, plus or minus 5 percent. In one preferred embodiment, the lip height 153 is between about 0.2 inch and about 0.4 inch, for example, about 0.3 inch, plus or minus 5 percent.

Still referring to FIG. 5, the lip 53 is provided outside of at least a portion of the feeder port 55; in this example, the feeder port 55 extending from the lip 53 toward a middle portion of the pet feeding system 5. Accordingly, with respect to a longitudinal axis (not shown) that extends generally orthogonally with respect to the floor 30, for example, in an upright direction, the lip 53 is spaced further from the longitudinal axis than is an upper portion of the feeder port 55.

Referring again to FIGS. 4 and 5, in this embodiment, a trough 200 extends outwardly beyond the housing 50. The trough 200 is an annular catch tray that extends radially outward about a periphery of the housing 50. The trough 200 catches food 10 that is removed from the chamber 60, holding it in the pet feeding system 5 while presenting it in an accessible way for consumption by the pet or for removal from the trough 200 so that the pet consumes individual pieces of food 10 from a floor or other underlying support surface upon which the pet feeding system 5 sits.

Shown best in FIG. 5, the trough 200 of this embodiment is integral with a bottom portion of the sidewall 52 so that the trough 200 concentrically surrounds the floor 30 that is recessed into and nested within the housing 50. Trough 200 is open from above and includes lower wall 210 and a collar 220 that extends upwardly from an outermost segment of the lower wall 210. The lower wall 210 and collar 220 extend at least partway along the perimeter of the housing 50 and are shown in FIG. 4 as extending continuously about the entire perimeter of the housing 50. Trough 200 defines a trough width 201 that corresponds to a distance that the lower wall 210 extends in a transverse direction beyond the sidewall 52. In this embodiment, the trough width 201 is larger than a collar height 221 that is defined by a distance at which the collar 220 extends upwardly beyond the lower wall 210. The collar height 221, in one preferred embodiment, is between about 15 percent to about 30 percent of the trough width 2011, for example, the trough width 201 can be about 0.6 inch and the collar height 221 can be about 0.15 inch.

Still referring to FIG. 5, in this embodiment, floor 30 is held in the housing 50 not only by the engagement of ramps 38 (FIG. 2) and tabs 40 (FIG. 2), but also by at least one and, preferably, multiple stops 41. Stops 41 extend inwardly from an inner surface of the housing 50 and serve as shoulders that engage the upper surface of the floor 30 so as to mechanically prevent further advancement of the floor 30 into the housing 50. For embodiments that include multiple stops 41, the stops 41 are spaced from each other about the perimeter of the housing 50.

Still referring to FIG. 5, this embodiment of the pet feeding system 5 further includes at least one and, preferably, multiple legs 250 that extend from the dish assembly 20 so as to hold the entire pet feeding system 5, optionally, the floor 30 or the trough 200, spaced from and slightly about an underlying support surface, such as a floor 8 or other suitable support surface. In the embodiment of FIG. 5, the legs 250 are connected to and extend downwardly from a lower surface of floor 30 toward an underlying support surface and hold both the floor 30 and the trough 200 spaced above the underlying support surface of floor 8. Legs 250 include resilient feet 255 which are preferably made from rubber, another elastomeric material, or other material with a suitably large coefficient of friction. The feet 255 are configured to provide enough friction between the pet feeding system 5 and the floor 8 so that the pet feeding system 5 does not move while a pet removes food 10 from the chamber 60 but instead maintains its position on the floor 8 without sliding, tipping, or otherwise moving.

In one preferred embodiment, each of feet 255 provides a relatively small footprint or surface area of engagement with the floor 8, for example, each foot 255 can have a round perimeter shape and a radius of about 0.3 inch, plus or minus 10 percent. Preferably, the pet feeding system includes at least three feet 255 although other numbers may be provided, for example, six feet 255, that collectively define a supporting interface between pet feeding system 5 and the underlying floor 8 that is substantially less than if, for example, the pet feeding system 5 was supported by the entire surface area of the bottom of the dish assembly 20. This provides a greater amount of pressure at the supporting interface(s) between the pet feeding system 5 and the underlying floor 8 than if the pet feeding system 5 was supported by the entire surface area of the bottom of the dish assembly 20 which may enhance the stability of the pet feeding system 5 upon the floor 8, ensuring that it does not move during use.

Figure 6:
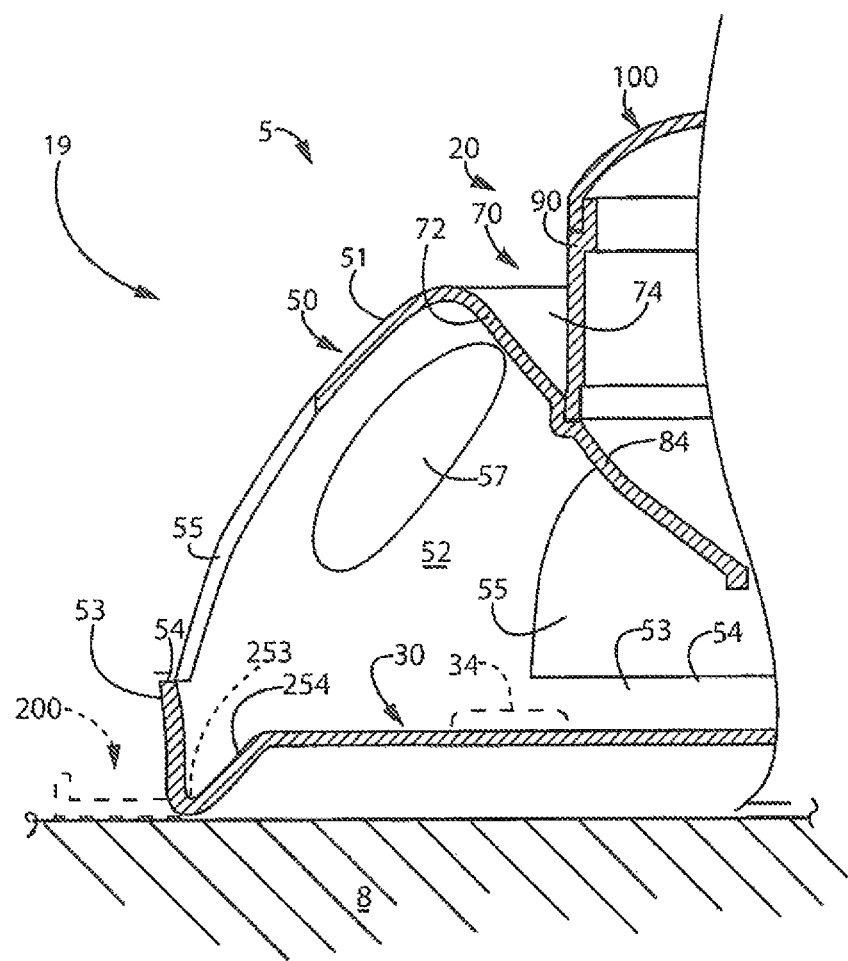
FIG. 6 is a cross-sectional view of another variant of the pet feeding system of FIG. 1.

Referring now to FIG. 6, this embodiment is exemplary of a dish assembly 20 of the pet feeding system 5 that is made from, or has at least some components made from, ceramic material(s) or other materials that are substantially heavier than plastic materials. This ceramic dish assembly 20 is sufficiently heavy so that its weight alone prevents its movement along the floor 8 when a pet removes food 10 from the chamber 60. Accordingly, this embodiment is devoid of the legs 250 and feet 255 winch were described above with respect to the relatively lighter, at least partially plastic, embodiment of the dish assembly 20.

Still referring to FIG. 6, this embodiment includes a channel 253 that is defined between the floor 30 and the lip 53. Channel 253 extends as a depression downwardly from an outer periphery of the floor 30. This embodiment of channel 253 includes a slanted wall 254 that extends angularly from the floor 30 toward a point of intersection between the slanted wall 254 and the lip 53. The lip 53 extends angularly away from the slanted wall 254 so that the channel 253 defines a generally V-shaped cross-section and is open toward an upper end of the channel 253. The channel 253 thus extends alongside the lip 53 of each feeder port 55 generally transverse to the direction of kibble withdrawal through the port opening. If desired, the channel 253 can have a different cross-sectional contour, such as a flat bottomed channel or a channel 253 with a rounded bottom, in which at least a portion of a piece of pet food, e.g., a kibble, can be received or otherwise disposed. Where the base or floor 30 is generally circular or round, the channel 253 can be annular and uninterrupted such that the channel 253 can adjoin each lip. In one preferred embodiment, the channel 253 is integrally formed of the bottom or floor 30 of dish assembly 20. In another preferred embodiment, the channel 253 can be integrally formed by part of the enclosure, e.g., dome or housing 50 overlying the floor 30. In a still further preferred embodiment, the channel 253 is integrally fanned of part of the dish assembly 20 that includes not only the bottom for floor 30, but also each lip 53 of each feeder port 55. This may allow for a unitary construction of the floor 30, channel 253, and lip 53 that may facilitate construction of the pet feeding system 5 from ceramic or other materials that may benefit from unitary configurations.

Where a channel 253 adjacent the lip 53 is employed, the depth of the channel 53 relative to the height of the lip 53 is selected so the lip 53 extends upwardly by at least one-half of the width or diameter of an average piece 11 of food 10 disposed within the channel. For example, where kibble-type pet food is used, the lip 53 extends upwardly from the channel 53 to a height that is at least one-half of the width or diameter of an average piece of kibble in the channel 53 to provide an obstruction over which a pet engaging the kibble with its paw must lift the kibble to remove it from the enclosure of the dish assembly 20.

In light of the above, during use of the pet feeding system 5, food 10 is presented to a pet in a manner that challenges the pet, and reduces the pet's food consumption rate such that it can and, preferably, does help regulate pet food intake. That is done by way of dish assembly 20 which presents one or more obstacles to free accessibility of the food 10 to the pet so as to passively meter the removal of food 10 from the pet feeding system 5. The dish assembly 20 simulates certain hunting-like scenarios in a manner that takes advantage and encourages the natural instinct of the pet, in this example the pet being a cat 21, so that the cat may want to seek out, hunt as well as "play" with its food 10, without allowing the dish assembly 20 to be moved. As a result of the cat 21 having to work to get its food in this manner, it reduces the likelihood of the cat overeating, preferably, preventing it, while at the same time reducing a likelihood of the cat making a mess while eating by tipping the dish assembly 20 or sliding the dish assembly 20 across its supporting floor 8 (FIGS. 5-10), since the dish assembly 20 is configured to resist tipping, sliding, and/or other movements during use.

Referring now to FIGS. 2-4, to use the pet feeding system 5, a user connects the floor 30 to the housing 50 and places food 10 either directly in the bowl 72 or into the container 90 and thus also into the bowl 72. In some embodiments, the container 90 may be filled while separated from and then later attached to the dish assembly 20. For example and referring to FIG. 11, the container 90 may be separated from the dish assembly 20, filled with food 10 (FIG. 1), and then turned upside down so that the neck 92 faces upwardly. Then the dish assembly 20 may be turned upside down and placed on top of the then upside down container 90. The dish assembly 20 and container 90 are rotated with respect to each other so that the threads 83 of the chute 80 engage the threads 91 of the container so as to lock the dish assembly 20 and container 90 to each other and complete the assemblage of the pet feeding system 5. The pet feeding system 5 is then moved to its in-use location, flipped upright, and set down upon the floor 8 in the upright, in-use position.

As shown in FIGS. 1, 3, and 7-10, after the container 90 is filled with food 10 and the pet feeding system 5 is in its in-use position, upon so doing, some food 10 is gravity-dispensed through the opening 82 of chute 80 and it begins piling on the floor 30. It is noted that only some of the food 10 that enters the bowl 72 passes through the chute 80, opening 82, and piles onto the floor 30, with the remainder of the food 10 being held upstream of the floor 30 in such dispensation series. At this point, the entire contents of food 10 can be defined as three distinct portions or volumes.

Referring specifically now to FIG. 3 and to the multiple portions of the entire volume of food 10, dispensed food 12 sits directly upon the upper surface of floor 30. The dispensed food 12 occupies an area on the floor 30 that extends generally across the upraised platform 32 or adjacent an upraised button 34 or between the upraised portions 34. Typically, after first filling the dish assembly 20 with food, the dispensed food 12 spills across and sits upon a central portion of the floor so that it is spaced from the outer perimeter of the floor 30. The upraised button(s) 34 can mechanically restrain the dispensed food 12 from expanding or spilling radially or outwardly beyond their position upon the floor. Accordingly, a perimeter shape and width of a footprint of the dispensed food 12 upon the floor 30 may correspond to the spacing between the adjacent upraised portions 34, as well as the radial distance between the upraised portions 34 and the opening 82 of chute 80 or the middle of the floor 30, for embodiments that include more than one upraised button 34.

For example, in embodiments having multiple upraised portions 34, when the upraised portions 34 are spaced from the middle of the floor 30 by a distance of about 1¼ inch, as defined between a central axis of the floor 30 and the surface of upraised portions 34 that is closest thereto, the dispensed food 12 (FIG. 3) typically will spill across and settle in a manner that forms a generally circular perimeter shape having a similar radius, that is about 1¼ inch to about 2 inches, depending on the particular characteristics of the individual kibbles of the food 10, that is, their size, density, greasiness or dryness, and/or other factors. Stated another way, in sonic embodiments, the positions of the upraised portions 34 upon the floor 30 influences a perimeter site and shape of the dispensed food 12.

Furthermore, the positions of upraised button(s) 34 upon the floor 30 are selected to provide a challenge to the pet when trying to withdraw food 10 from the chamber 60, but without being unduly difficult to surmount so as to not overly frustrate the pet. This can be accomplished by positioning the upraised portions 34 on the floor 30 so that they are spaced about 1½ inch or more from an outer perimeter of the floor 30 and providing the upraised portions 34 with diameters of about 1 inch. Furthermore, the upraised portions 34 are preferably located off-center or at least somewhat misaligned with the feeder ports 55 which allows the pet to withdraw food from the chamber 60 by dragging pieces of the dispensed food 12 (FIG. 3) straight from the feeder ports 55 or generally radially across the floor 30.

Figure 7:
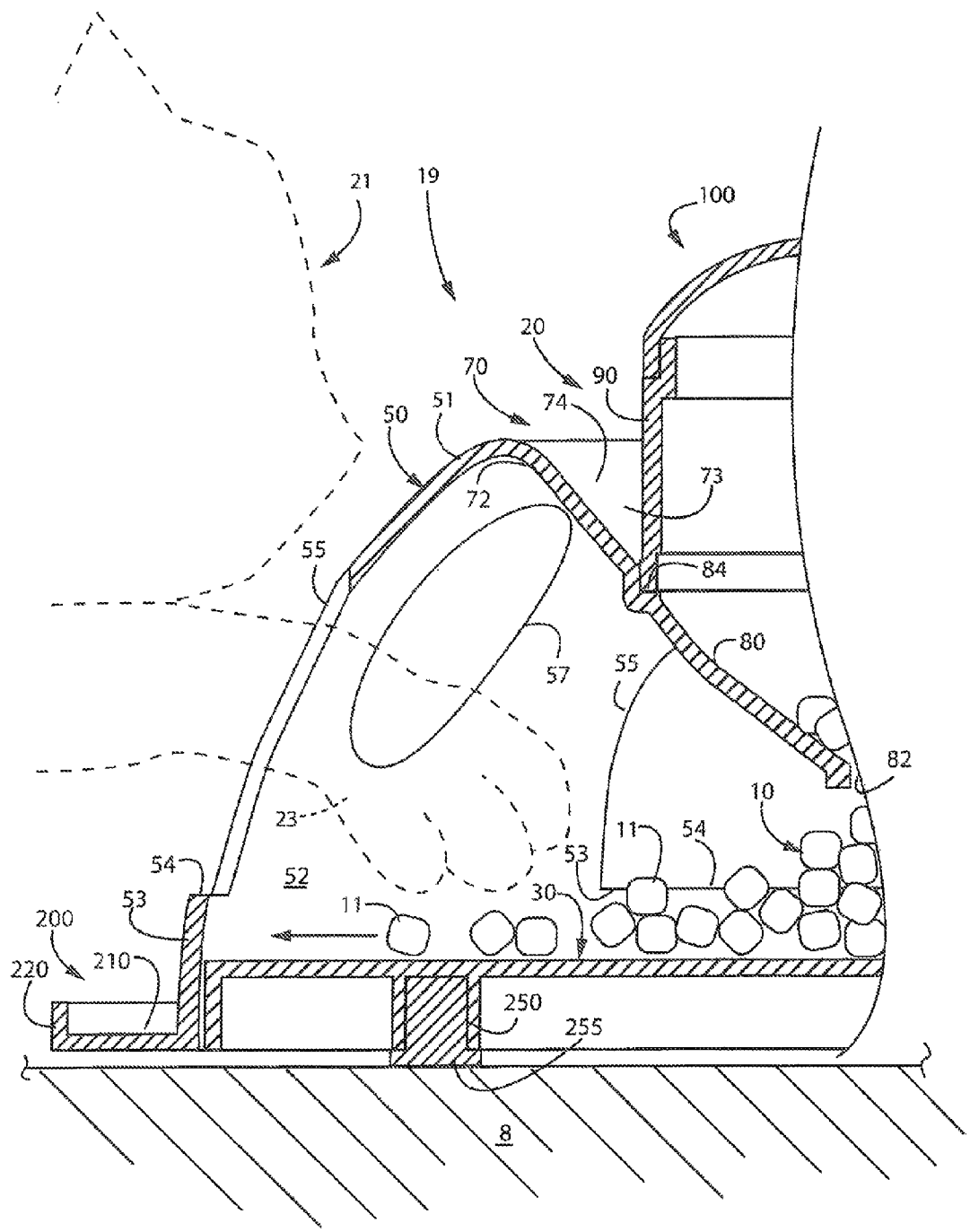
FIG. 7 is a cross-sectional view of the dish assembly of FIG. 5.
Figure 8:
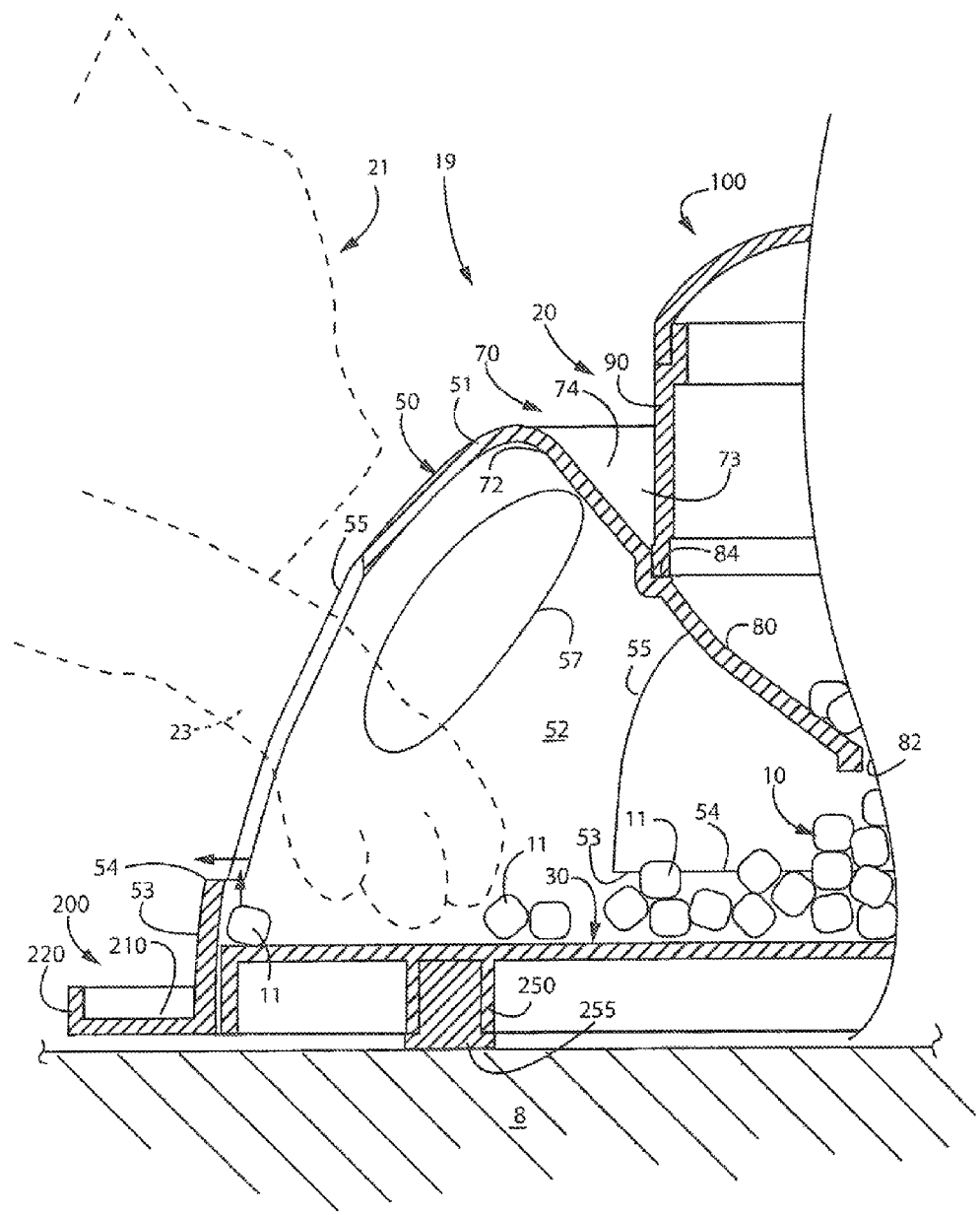
FIG. 8 is another cross-sectional view of the dish assembly of FIG. 5.
Figure 9:
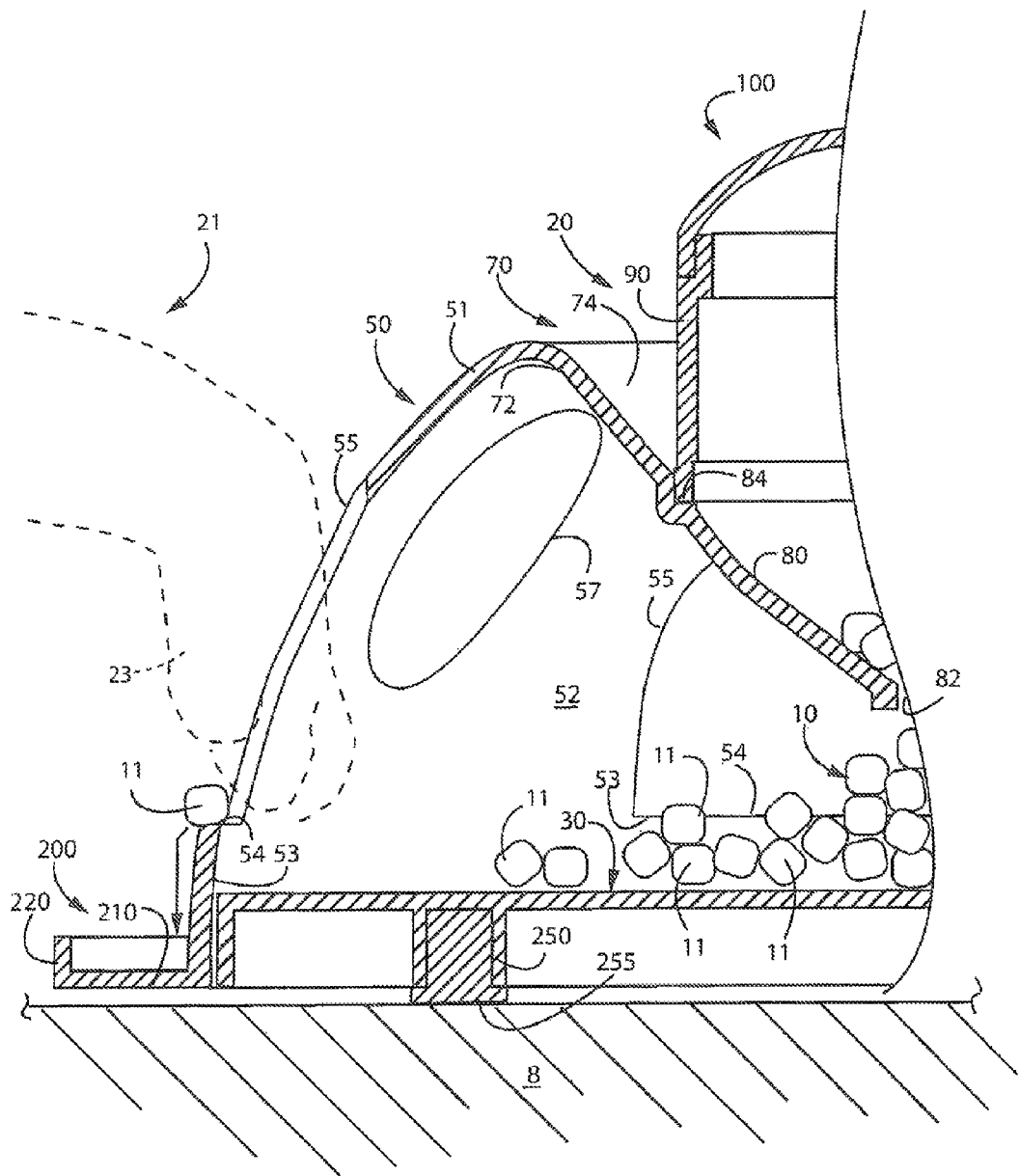
FIG. 9 is another cross-sectional view of the dish assembly of FIG. 5.
Figure 10:
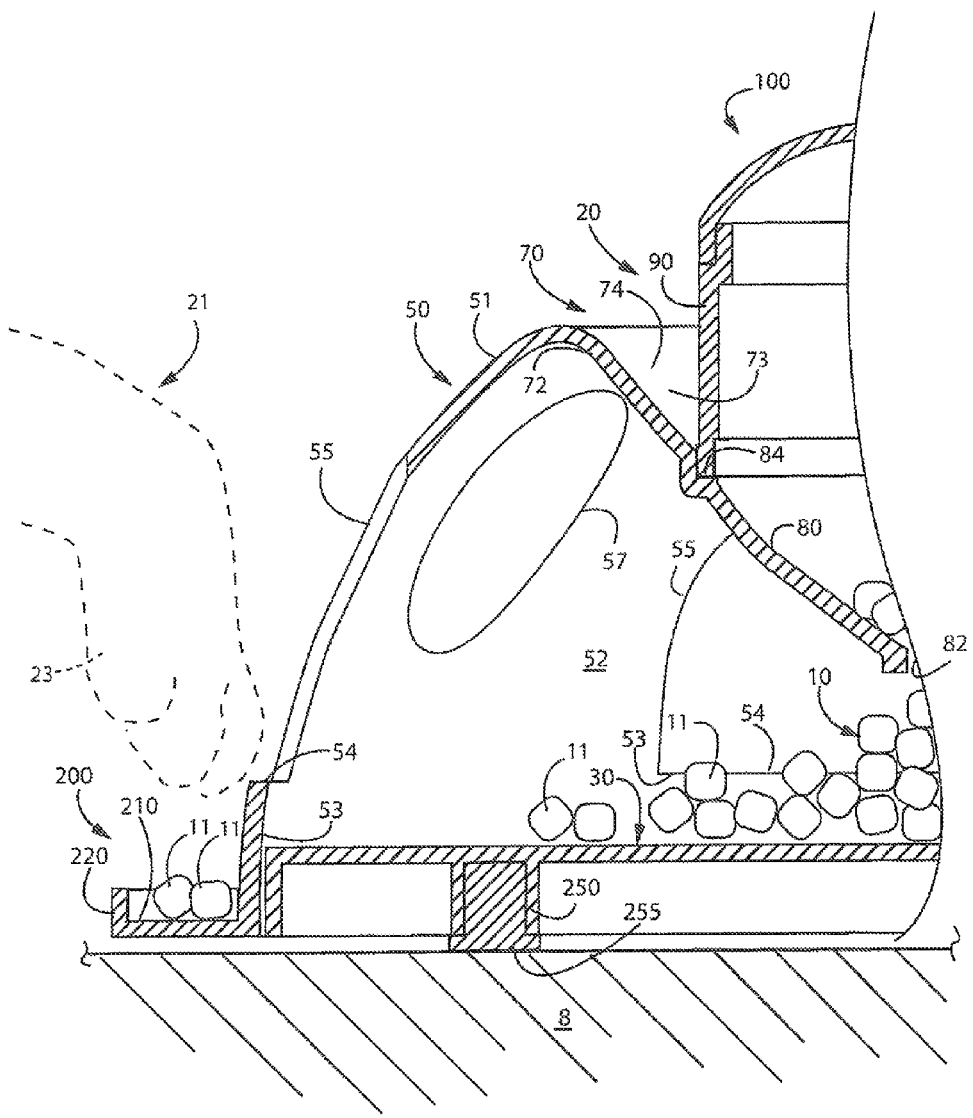
FIG. 10 is another cross-sectional view of the dish assembly of FIG. 5.

Referring now to FIGS. 7-10, in embodiments that include a lip 53, the lip 53 presents an additional challenge to or in lieu of the button(s) 34. A removal path(s) along which pieces of kibble can be removed from the chamber 60 to overcome the obstacle of the lip 53 is illustrated by arrows in FIGS. 7-9. As shown in FIG. 7, the cat 21 reaches its paw 23 through the feeder port 55 and drags a piece or kibble 11 of the food 10 away from the middle of the floor 30 toward the outer periphery of the floor 30. As shown in FIG. 8, the cat 21 pulls the piece or kibble 11, wedging the piece or kibble 11 between its paw 23 and an inwardly facing surface of the lip 53. At this point, if the embodiment of FIG. 6 is being used, then the piece or kibble 11 would be within the channel 253. Referring again to FIG. 8, the cat 21 pulls the piece or kibble 11 upwardly, sliding the piece or kibble 11 up the inwardly facing surface of the lip 53, and then outwardly through the feeder port 55. At this point, the piece or kibble 11 may be resting upon the upper edge 54 of the lip 53 as shown in FIG. 9. Still referring to FIG. 9, the cat 21 pulls the piece or kibble 11 further out through the feeder port 55 and the piece or kibble 11 freely falls down along an outside surface of the lip 53, into the trough 200 for embodiments that include trough 200, otherwise onto the ground 8 (for embodiments lacking trough 200). For embodiments that include trough 200, the piece(s) or kibble 11 is retained in the trough 200 in preference to spilling onto the floor 8. The cat 21 may eat the piece(s) or kibble 11 directly from the trough 200 or it may pull the piece(s) or kibble 11 up and over the collar 220 and thus out of the trough 200 in a manner that is substantially analogous to that described above with respect to pulling the piece or kibble 11 up and over the lip 53, and then eat the piece(s) or kibble 11 from the floor 8.

When some of the dispensed food 12 (FIG. 3) is dragged from the chamber 60, a similar amount of supporting food 14 (FIG. 3) falls onto the floor 30, taking the place of the removed dispensed food 12. Doing so generally maintains the volume and perimeter shape of the dispensed food 12 by way of gravity replacing the dispensed food 12 with some of the supporting food 14. Stated another way, supporting food 14 extends upwardly from the dispensed food 12, typically, in a pile that decreases in width as it increases in height so that it resembles a cone or pyramid.

The uppermost pieces of the supporting food 14 (FIG. 3) are positioned within the opening 82 of the chute 80, such that the supporting food 14 serves as a plug that maintains position of stored food 16 (FIG. 3) that is held in the chute 80 and bowl 72, preventing the stored food 16 from falling through the opening 82. In this regard, the pet controls the rate of dispensation of the food 10 because food passes through the chute 80 and out of the opening 82 at approximately the same rate as the pieces of the dispensed food 12 are removed from the remainder of the dispensed food 12 pile and for example, removed from the chamber 60.

It is noted that for such intermittent dispensation of food 10 to work suitably well, in preferred embodiments, the plugging action of supporting food 14 is directly primarily upwardly into the opening 82. In other words, since there is a negligible amount of horizontally directed jamming that occurs within the chute 80, if there is no supporting food 14 that directly holds the stored food 16 from below, then at least some of the stored food 16 will freely slide through the chute 80 and fall out of the opening 82. This continues to occur, whereby a pile is formed below the opening 82 and upon the dispensed food 12, until such pile reaches such a height that the upper part of the pile abuts the stored food 16, whereby the pile (FIG. 3) once again defines a supporting food 14 volume. Accordingly, the particular diameter of opening 82 of the chute 80 and the distance from opening 82 from the underlying floor 30 are selected based on, for example, typical kibble size and shape of food 10 so as to impart such a vertically directed jamming or plugging characteristic of the supporting food 14 at opening 82 for supporting the stored food 16.

Various alternatives are contemplated as being within the scope of the subject matter regarded as the invention. For example, in some embodiments, floor 30 is not a component of the dish assembly 20, but instead is defined as a portion of a floor of a building in which the feeding system 5 is used and which underlies the housing 50. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A pet feeding system, comprising:
   a pet food dispenser comprising (a) a sidewall defining a food-receiving chamber having at least one opening formed in the sidewall defining a feeder port, and (b) a top portion overlying at least part of the food-receiving chamber and having a recessed portion comprising a pet food container receptacle; and
   a pet food container carried by the pet food dispenser, the pet food container having a container body with a tubular neck removably received in the pet food container receptacle of the pet food dispenser, the tubular neck having a pet food container discharge opening through which pet food passes from the pet food container into the food-receiving chamber of the pet food dispenser when the tubular neck is removably received in the pet food container receptacle of the pet food dispenser.

2. The pet feeding system of claim 1, wherein the tubular neck is narrower than the rest of the container body.

3. The pet feeding system of claim 1, wherein the recessed portion of the pet food dispenser is annular and supports part of the container body when the tubular neck is removably received in the pet food container receptacle of the pet food dispenser.

4. The pet feeding system of claim 1, wherein the sidewall of the pet food dispenser extends outwardly of the pet food container discharge opening about the entire periphery of the pet food container discharge opening when the tubular neck of the pet food container is removably received in the pet food container receptacle of the pet food dispenser.

5. The pet feeding system of claim 1, wherein the sidewall of the pet food dispenser has a plurality of spaced apart feeder ports disposed outwardly of the pet food container discharge opening when the tubular neck of the pet food container is removably received in the pet food container receptacle of the pet food dispenser.

6. The pet feeding system of claim 1, wherein the sidewall of the pet food dispenser has a plurality of feeder ports disposed outwardly of the pet food container body when the tubular neck of the pet food container is removably received in the pet food container receptacle of the pet food dispenser.

7. The pet feeding system of claim 1, wherein the pet food dispenser sidewall is annular.

8. The pet feeding system of claim 1, wherein the pet food container further comprises (a) a pet food container refill opening formed in the pet food container body spaced from the tubular neck that is larger than the pet food container discharge opening, and (b) a cap removably engaging the pet food container body removably covering the pet food container refill opening.

9. The pet feeding system of claim 1, wherein the pet food container discharge opening is narrower than a width or diameter of the pet food container body.

10. The pet feeding system of claim 1, wherein the pet food container body is formed of one piece.

11. The pet feeding system of claim 1, wherein the pet food container further comprises a pet food container refill opening formed in the pet food container body that is located at an end of the pet food container body opposite the pet food container discharge opening.

12. The pet feeding system of claim 1, wherein the pet food container body is threaded and the recessed portion of the pet food dispenser is threaded, and wherein the pet food container body threadably engages with the recessed portion of the pet food dispenser when the tubular neck of the pet food container is removably received in the pet food container receptacle of the pet food dispenser.

13. A pet feeding system, comprising:
a pet food dispenser; and
a pet food container carried by the pet food dispenser, the pet food container having a pet food container discharge opening; and
wherein the pet food dispenser comprises an annular housing having a recessed receptacle formed in a top portion of the annular housing that defines a pet food container seat in which a portion of the pet food container having the pet food container discharge opening is removably received; and wherein the pet food dispenser housing is generally dome shaped and wherein the pet food container seat is comprised of a recess generally centrally formed in a top portion of the pet food dispenser housing.

14. The pet feeding system of claim 13, wherein the pet food container has a container body from which a narrower tubular neck outwardly extends with the pet food container discharge opening formed in the tubular neck, and wherein the portion of the pet food container having the pet rood container discharge opening removably received in the pet food container seat includes the tubular neck.

15. The pet feeding system of claim 13, wherein the pet food dispenser further comprises a plurality of spaced apart openings formed in the dome shaped housing that each define a feeder port that enables a pet to access pet food.

16. The pet feeding system of claim 13, wherein the pet food container seat of the pet food dispenser is annular and funnel-shaped, and wherein part of the pet food container rests on the pet food container seat and is supported thereon when the pet food container is seated in the pet food container seat of the pet food dispenser.

17. The pet feeding system of claim 13, wherein the pet food container has a pet food container refill opening spaced from the pet food container discharge opening that is disposed above the pet food dispenser when the pet food container is seated in the pet food container seat of the pet food dispenser.

18. The pet feeding system of claim 13, wherein a friction fit is provided between the portion of the pet food container seated in the pet food container seat of the pet food dispenser and the pet food container seat.

19. A pet feeding system, comprising:
a pet food container having a food discharge opening formed therein; and
a pet food dispenser comprised of a housing defining a food receiving chamber having at least one opening formed therein defining a feeder port providing pet access to pet food in the food receiving chamber, the housing having a top portion with a receptacle in which the pet food container is removably received disposing the food discharge opening of the pet food container in communication with the food receiving chamber; and
wherein the pet food dispenser housing has a plurality of spaced apart feeder port openings formed therein that are each outwardly disposed of the food discharge opening formed in the pet food container.

20. The pet feeding system of claim 19, wherein the pet food container has a pet food holding body from which a tubular neck outwardly extends in which the food discharge opening is formed, and wherein the receptacle of the pet food dispenser housing comprises a recess formed therein having an opening in communication with the food receiving chamber.

21. The pet feeding system of claim 19, wherein a bottom portion of the pet food container is formed by part of the top portion of the housing of the pet food dispenser.

22. A pet feeding system, comprising:
a pet food container having a tubular neck with a food discharge opening formed therein; and
a pet food dispenser comprised of a food receiving chamber underlying the pet food container, the food receiving chamber defined by a housing having (a) a receptacle formed in the housing in which the tubular neck of the pet food container is received disposing the food discharge opening of the pet food container in communication with the food receiving chamber of the pet food dispenser, and (b) a plurality of spaced apart feeder port openings formed in the housing that are each disposed below the food discharge opening of the pet food container received in the receptacle.

23. The pet feeding system of claim 22, wherein the receptacle is recessed into a top portion of the pet food dispenser housing.

\* \* \* \* \*